(12) United States Patent
Mohrmann et al.

(10) Patent No.: US 8,285,977 B2
(45) Date of Patent: Oct. 9, 2012

(54) SYSTEM AND METHOD FOR EXTENSION OF THE BIOS BOOT SPECIFICATION

(75) Inventors: Vaden A. Mohrmann, Round Rock, TX (US); Lowell B. Dennis, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 1261 days.

(21) Appl. No.: 11/923,271

(22) Filed: Oct. 24, 2007

(65) Prior Publication Data

US 2009/0113195 A1 Apr. 30, 2009

(51) Int. Cl.
*G06F 9/00* (2006.01)
*G06F 15/177* (2006.01)

(52) U.S. Cl. .................................. 713/2; 713/1
(58) Field of Classification Search .................. 713/1, 2
See application file for complete search history.

(56) References Cited

U.S. PATENT DOCUMENTS

| | | | |
|---|---|---|---|
| 5,274,816 A * | 12/1993 | Oka | 713/2 |
| 5,857,103 A * | 1/1999 | Grove | 717/158 |
| 6,035,395 A * | 3/2000 | Saito | 713/1 |
| 6,292,890 B1 * | 9/2001 | Crisan | 713/2 |
| 6,317,828 B1 | 11/2001 | Nunn | |
| 6,553,432 B1 * | 4/2003 | Critz et al. | 710/10 |
| 6,721,883 B1 * | 4/2004 | Khatri et al. | 713/2 |
| 6,785,838 B2 * | 8/2004 | Lim et al. | 714/7 |
| 6,990,685 B1 * | 1/2006 | Christensen et al. | 726/34 |
| 6,993,649 B2 * | 1/2006 | Hensley | 713/2 |
| 7,353,376 B2 * | 4/2008 | Dennis et al. | 713/1 |
| 7,584,347 B2 * | 9/2009 | El-Haj-mahmoud et al. | 713/1 |
| 7,607,002 B2 * | 10/2009 | Padilla et al. | 713/1 |
| 7,966,484 B1 * | 6/2011 | Deetz et al. | 713/1 |
| 2003/0084278 A1 * | 5/2003 | Cromer et al. | 713/2 |
| 2003/0233535 A1 * | 12/2003 | Nunn et al. | 713/1 |
| 2004/0215949 A1 * | 10/2004 | Dennis et al. | 713/1 |
| 2005/0027977 A1 * | 2/2005 | Taylor | 713/2 |
| 2005/0038985 A1 * | 2/2005 | Taylor | 713/2 |
| 2006/0294353 A1 * | 12/2006 | Rothman et al. | 713/1 |

* cited by examiner

*Primary Examiner* — Kim Huynh
*Assistant Examiner* — Zahid Choudhury
(74) *Attorney, Agent, or Firm* — Baker Botts L.L.P.

(57) ABSTRACT

A system and method is disclosed for extending the BIOS Boot Specification. The specification is extended to accommodate the identification of a greater number of bootable devices. The specification is also extended so that the identifier for each bootable device identifies the default boot order of the device. The specification is also extended to provide additional information about the type of each bootable device and whether each bootable device is an onboard or add-in device. The extension of the BIOS Boot Specification also allows for the designation of certain entries as placeholders for devices that that are supported by the computer system, but not present in the computer system.

19 Claims, 2 Drawing Sheets

SYSTEM AND METHOD FOR EXTENSION OF THE BIOS BOOT SPECIFICATION

TECHNICAL FIELD

The present disclosure relates generally to computer systems and information handling systems, and, more particularly, to a system and method for the extension of the BIOS Boot Specification.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A computing system will typically include a Basic Input/Output System (BIOS), which is the firmware code executed by the computing system when the computing system is first powered-up or rebooted. The BIOS may be stored in flash memory and initializes the computer system. One function of the BIOS is to identify the bootable devices of the computing system, prioritize them as source for booting the computing system, and sequentially target each device for booting the computer system. The methodology used by the computing system to perform the function of identifying the bootable devices of the computer system and prioritize them is included in the BIOS Boot Specification, which is a specification that was first established in 1996 by Compaq Computer Corporation; Phoenix Technologies, Ltd.; and Intel Corporation. Although the BIOS Boot Specification is still followed, it has some limitations, including limits on the number of supported devices, a limit on the flexible reordering of entries, an inability to designate absent devices as placeholders, and an inability to discriminate between variations in bootable devices.

SUMMARY

In accordance with the present disclosure, a system and method is disclosed for extending the BIOS Boot Specification. The specification is extended to accommodate the identification of a greater number of bootable devices. In the example provided herein, the specification is extended to accommodate 256 bootable devices. The specification is also extended so that the identifier for each bootable device identifies the default boot order of the device. The specification is also extended to provide additional information about the type of each bootable device and whether each bootable device is an onboard or add-in device. The extension of the BIOS Boot Specification also allows for the designation of certain entries as placeholders for devices that that are supported by the computer system, but not present in the computer system.

The system and method disclosed herein is technically advantageous because it provides a method for returning the computer system to its default boot order. Each bootable device is associated with an entry that sets out the default boot order for the bootable device. In this manner, upon the occurrence of a system event or at the initiation of the user, the computer system can return to its default boot order. Another technical advantage of the system and method set out herein is a BIOS Boot Specification that allows for certain entries to serve as placeholders for bootable devices that are not currently part of the computer system. In this manner, a placeholder can be used for a bootable device and the computer system will not discard the entry as being vacant. The extension of the BIOS Boot Specification is also technically advantageous because the extension provides additional granularity as to the type of each bootable device and whether the bootable device is an onboard device or an add-in device. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
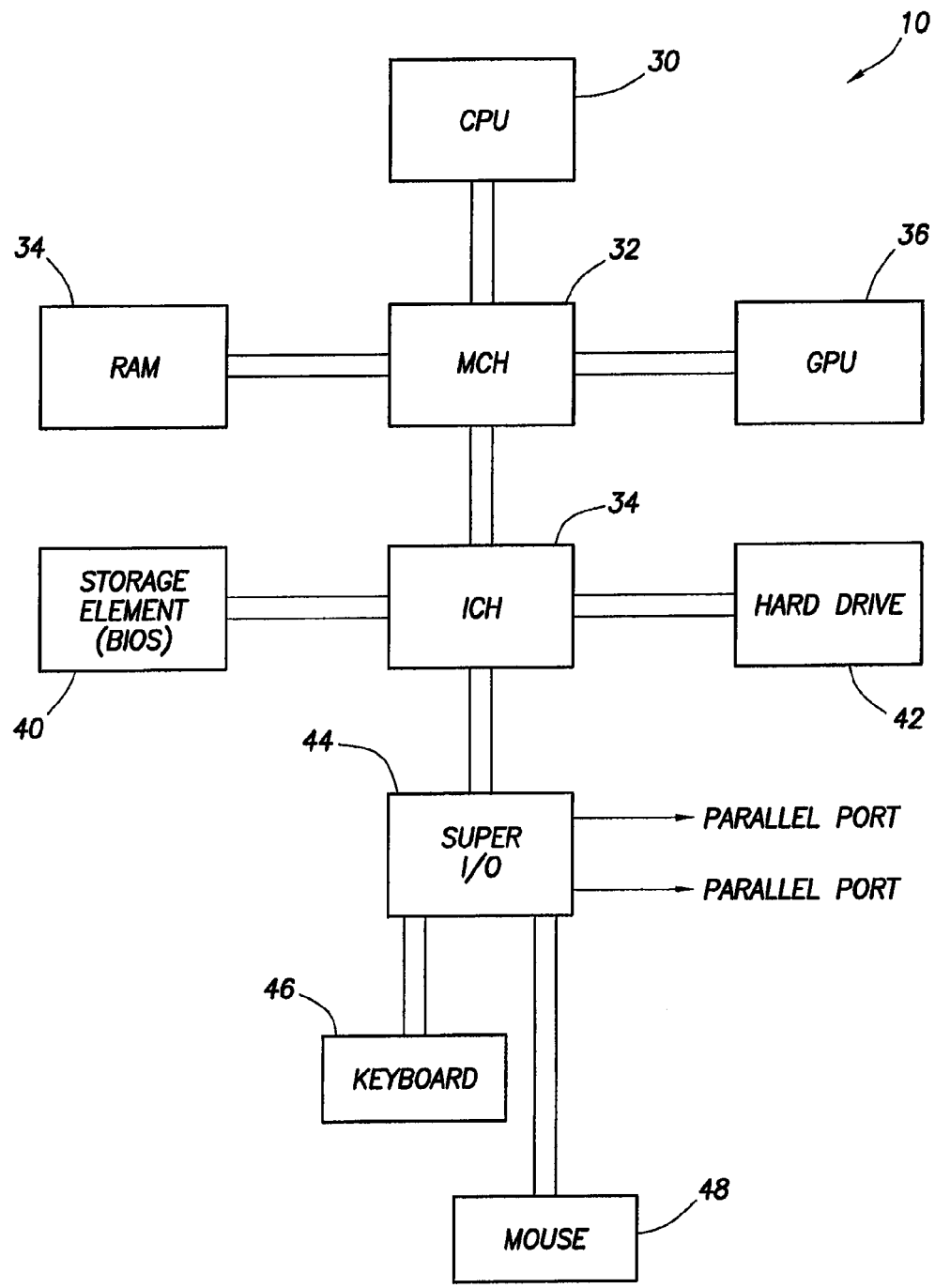
FIG. 1 is a block diagram of the components of a computing system.

Shown in FIG. 1 is a block diagram of the components of a computing system. A processor or CPU 30 of an example computer system 10 is communicatively coupled to a memory controller hub 32. Memory controller hub 32 is coupled to memory 34 and a graphics processing unit 36. Memory controller hub 32 is coupled to an I/O controller hub 34. I/O hub 34 is coupled to storage elements of the computer system, including a storage element 40 for the BIOS of the computer system and the hard drive 42 of the computer system. I/O hub 34 may also be coupled to a Super I/O chip 44, which is itself coupled to many of the I/O ports of the computer system, including keyboard 46, mouse 48, and parallel ports. The BIOS of the computer system may operate according to the BIOS Boot Specification.

Figure 2:
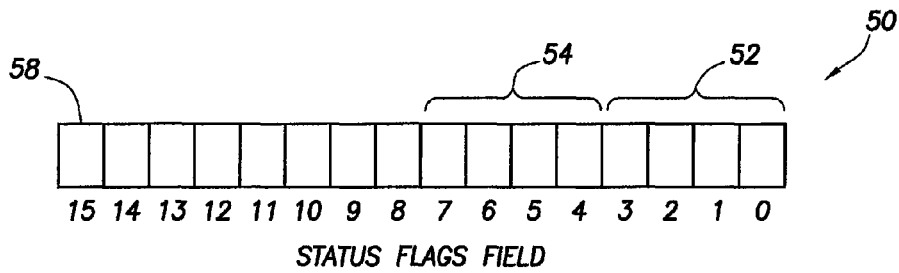
FIG. 2 is a diagram of a StatusFlags field of the BIOS Boot Specification.

A bootable device is any component in the computer system that can boot and load an operating system. The boot order of the bootable devices is shown in the boot connection vector (BCV) table and the BCV priority field. For each bootable device, the BIOS Boot Specification includes a sixteen-bit StatusFlags field, which is shown in FIG. 2 at 50. Bits 0 through 3 of the StatusFlags field are the Old Position bits, which identify the index of the device at the time of the last boot of the computer system and are indicated at 52. Bits 4 through 7 of the StatusFlags field, which are indicated at 54, are unused. In the extension of the BIOS Boot Specification disclosed herein, bits 4 through 7 will be used, enabling the computer system to include as many as 256 bootable devices. Bits 0 through 3 of the StatusFlags field, as an alternative to comprising the Old Position bits, could also indicate the default index of the device.

In the BIOS Boot Specification extension of the present invention, the entire range of bits 0 through 7 will be used to display the default boot order of the bootable device. In this manner, the bits 0 through 7 can be used by a utility to revert the computer system to a default boot order when the computer system encounters a system event, event such as an interrupt event or a user-initiated event, that indicates that the computer system should revert to the default boot order for the next subsequent boot of the computer system. In the BIOS Boot Specification extension of the present invention, bit 15, which is indicated at 58, is used to indicate that the entry is a place holder entry. The use of the bit 15 to identify the entry as a place holder entry provides a marker that indicates that the entry should not be removed during the execution of any routine that removes unused entries from the BCV table. In addition, the use of bit 15 as a place holder entry allows for entries for bootable devices that are supported by the system but are not yet included in the system. In this manner, although the entry associated with the bootable device is not present in the system, the bootable device can be added to the system and its position in the boot order is set through the place holder entry, which can be unchecked as being no longer dormant.

Figure 3:
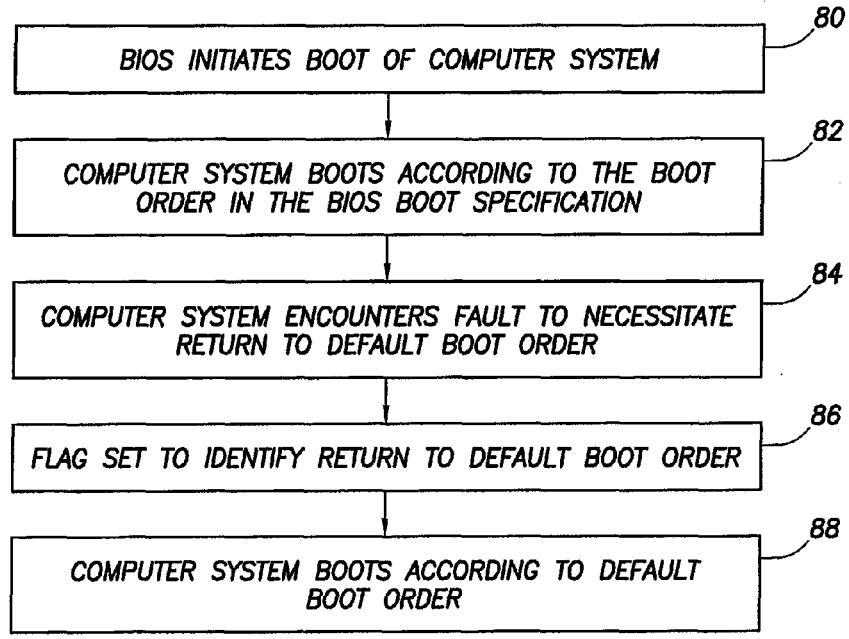
FIG. 3 is a flow diagram of the transition from a current boot order to a default boot order.

An example of the use of the default boot order bits is shown at FIG. 3. At step 80, the BIOS of the computer system initiates a boot of the computer system. At step 82, the computer system follows the boot order set out in the BIOS Boot Specification to boot the computer system. At step 84, the computer system encounters a fault that necessitates the return to the default or original boot order of the computer system. At step 86, a flag in the computer system is set to identify for the BIOS that, at the next boot of the computer system, the boot order of the system will revert to the default boot order, as set out in bits 0 through 7 of the StatusFlags field. At step 88, at the next boot of the computer system, the computer system boots according to the default boot order of the computer system.

Figure 4:
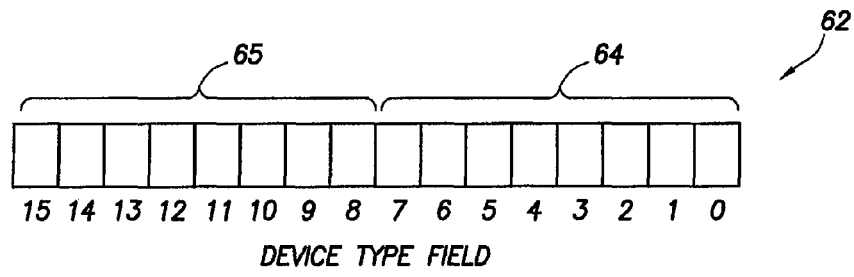
FIG. 4 is a diagram of the deviceType field.

For each bootable device of the computer system, the BIOS Boot Specification includes a sixteen-bit deviceType field, which is shown in FIG. 4 at 62. Bits 0 through 7, which are indicated at 64, identify the type of device according to a set of designations set out in the BIOS Boot Specification. Bits 8 through 15, which are indicated at 65, are currently not used as part of the BIOS Boot Specification. As part of the system and method disclosed herein, bits 8 through 15, which are indicated at 65, will be used for a class identification of the device. The inclusion of a class identification in the deviceType field will allow the BIOS to better discriminate between the devices of the computer system.

As an example, the class identifiers could be the class and subclass identifiers used in the PCI Local Bus Specification. For example the following identifiers could be used in the class identifier bits 65 to identify the bootable device as being one of the following devices within a master controller class:
    00h—SCSI bus controller
    01h—IDE controller
    02h—chip set (SIO or ICH, for example)
    03h—IPI bus controller
    04h—RAID controller
    05h—ATA controller
    06h—Serial ATA direct port access
    07h—SAS controller
    08h-0Eh—reserved
    0Fh—other mass controller In addition, the following identifiers could be used in the class identifier bits 65 to identify the bootable device as being one of the following devices within a master controller class:
    10h—Ethernet controller
    11h—Token Ring controller
    12h—FDDI controller
    13h—ATM controller
    14h—ISDN controller
    15h—WorldFip controller
    16h—PICMG 2.4 Multi Computing
    17h-1Eh—Reserved
    1Fh—Other network controller In addition, the following identifiers could be used in the class identifier bits 65 to identify the bootable device as being one of the following devices within a serial controller class:
    20h—IEEE 1394 (Firewire)
    21h—ACCESS.bus
    22h—SSA
    23h—USB
    24h—Fibre Channel
    25h—SMBus
    26h—InfinBand
    27h—IPMI
    28h—SERCOS Interface Standard
    29h—CANbus
    2Ah-2Eh—Reserved
    2Fh—Other serial bus Identifiers 30-7F could be reserved. Through the use of the foregoing identifies in the class identifier bits 65, the code of the BIOS is better able to discriminate between the features of the bootable devices of the computing. In this manner, the identification of the bootable devices is more granular and more information is used to describe each entry, allowing the BIOS to execute routines that depend, at least in part, on the content of the class identifier bits 65. In addition, bit 15 of sixteen-bit deviceType field 62 would identify whether the bootable device is an onboard device (logical 0) or an add-in device (logical 1).

Another modification of the BIOS Boot Specification would involve the addition of a new set of definitions to the device type bits 64. The new definitions would be 81h for a floppy device; 82h for a hard drive device; and 83h for a CD-ROM device. The addition of these device types would also add more information to the definition of at least some of the bootable devices of the computing system.

It should be recognized that the system and method disclosed herein is not limited for use in the BIOS Boot Specification. Rather, the system and method disclosed herein may be employed with any boot specification that includes a data structure with reserved entries in the definitions of the bootable devices of the system. Although the present disclosure has been described in detail, it should be understood that various changes, substitutions, and alterations can be made hereto without departing from the spirit and the scope of the invention as defined by the appended claims.

What is claimed is:

1. A method for extending the boot order specification of a computer system, comprising:
    for each bootable device that is present in the computer system, including in a current boot order stored in the computer system an entry that has an identifier for the bootable device, wherein the identifier in the entry has a bit length of greater than four bits, and wherein the entry for the bootable device identifies a default boot order of the bootable device; and
    for at least one bootable device that is not present in the computer system, using a flag in an entry in the boot order specification to identify that the entry is a place holder for a bootable device that is supported by the computer system but not present in the computer system;
    initiating at a Basic Input/Output System (BIOS) of the computer system a first boot sequence using the default boot order if a system event has occurred; and
    initiating at the BIOS a second boot sequence using the current boot order if the system event has not occurred.

2. A method for extending the boot order specification of a computer system of claim 1, wherein the boot order specification is the BIOS Boot Specification.

3. A method for extending the boot order specification of a computer system of claim 2, wherein the entry for each bootable device in the computer system includes a DeviceType field that identifies, for each bootable device, the type of device.

4. A method for extending the boot order specification of a computer system of claim 2, wherein the entry for each bootable device in the computer system identifies whether the device is an onboard device.

5. A method for extending the boot order specification of a computer system of claim 2,
    wherein the entry for each bootable device in the computer system includes a DeviceType field that identifies, for each bootable device, the type of device; and
    wherein the entry for each bootable device in the computer system identifies whether the device is an onboard device.

6. A method for resetting the boot order of a computing system from the current boot order of the computer system to a default boot order, comprising:
    booting the computer system according to the current boot order of the computer system;
    for each bootable device that is present in the computer system, providing a data structure that includes an entry that has an identifier for the bootable device, wherein the entry identifies the default boot order of the bootable device;
    recognizing in the computer system a system event to cause the computer system to boot according to the default boot order of the computing device; and
    booting according to the default boot order on the next subsequent boot of the computer system.

7. The method for resetting the boot order of a computing system from the current boot order of the computer system to a default boot order of claim 6, wherein the data structure is defined by a boot order specification.

8. The method for resetting the boot order of a computing system from the current boot order of the computer system to a default boot order of claim 7, wherein the boot order specification is the BIOS Boot Specification.

9. The method for resetting the boot order of a computing system from the current boot order of the computer system to a default boot order of claim 8, wherein the length of the identifier is eight bits.

10. The method for resetting the boot order of a computing system from the current boot order of the computer system to a default boot order of claim 8, wherein the entry for each bootable device identifies if the entry is a place holder for a bootable device that is supported by the computer system but not present in the computer system.

11. The method for resetting the boot order of a computing system from the current boot order of the computer system to a default boot order of claim 8, wherein the entry for each bootable device includes a DeviceType field that identifies, for each bootable device, the type of device.

12. A method for extending the boot order specification of a computer system, comprising:
    for each bootable device that is present in the computer system, providing in a current boot order stored in the computer system a data structure that includes an entry that has an identifier for the bootable device, wherein the identifier in the entry has a bit length of greater than four bits, wherein the entry identifies a default boot order of the bootable device
    initiating at a Basic Input/Output System (BIOS) of the computer system a first boot sequence using the default boot order if a system event has occurred; and
    initiating at the BIOS a second boot sequence using the current boot order if the system event has not occurred.

13. The method for extending the boot order specification of a computer system of claim 12, wherein the length of the identifier for each bootable device is eight bits.

14. The method for extending the boot order specification of a computer system of claim 12, wherein the boot order specification is the BIOS Boot Specification.

15. The method for extending the boot order specification of a computer system of claim 12, further comprising the step of providing, for at least one bootable device that is not present in the computer system, a data structure that includes a flag in an entry that identifies that the entry is a place holder for a bootable device that is supported by the computer system but not present in the computer system.

16. The method for extending the boot order specification of a computer system of claim 12, wherein each entry in the data structure includes a DeviceType field that identifies, for each bootable device, the type of device.

17. The method for extending the boot order specification of a computer system of claim 12, wherein each entry in the data structure identifies whether the device is an onboard device.

18. The method for extending the boot order specification of a computer system of claim 12, wherein each entry in the data structure identifies whether the device is an add-on device within the computer system.

19. The method for extending the boot order specification of a computer system of claim 12,
   wherein the boot order specification is the BIOS Boot Specification; and
   further comprising the step of providing, for at least one bootable device that is not present in the computer system, a data structure that includes a flag in an entry that identifies that the entry is a place holder for a bootable device that is supported by the computer system but not present in the computer system.

* * * * *